US012800762B2

(12) United States Patent
Bessho

(10) Patent No.: US 12,800,762 B2
(45) Date of Patent: Nov. 17, 2026

(54) WORK VEHICLE

(71) Applicant: Kubota Corporation, Osaka (JP)

(72) Inventor: Hiroki Bessho, Sakai (JP)

(73) Assignee: Kubota Corporation, Osaka (JP)

( * ) Notice: Subject to any disclaimer, the term of this patent is extended or adjusted under 35 U.S.C. 154(b) by 404 days.

(21) Appl. No.: 18/386,754

(22) Filed: Nov. 3, 2023

(65) Prior Publication Data

US 2024/0157742 A1 May 16, 2024

(30) Foreign Application Priority Data

Nov. 11, 2022 (JP) ................................ 2022-181286

(51) Int. Cl.
*B60D 1/36* (2006.01)
*B60D 1/52* (2006.01)
*G01S 15/86* (2020.01)

(52) U.S. Cl.
CPC ................ *G01S 15/86* (2020.01); *B60D 1/36* (2013.01); *B60D 1/52* (2013.01)

(58) Field of Classification Search
CPC .................................. B60D 1/52; B60D 1/36
See application file for complete search history.

(56) References Cited

U.S. PATENT DOCUMENTS

2005/0104322 A1* 5/2005 Swannie ............... G01S 15/931 280/432
2013/0091962 A1* 4/2013 Gentner .................. G01L 1/122 73/862.621
2017/0001519 A1 1/2017 Bessho
2019/0211915 A1* 7/2019 Davis .................... F16H 61/662
2019/0217831 A1 7/2019 Viele
2019/0235519 A1 8/2019 Carter et al.
2020/0361261 A1 11/2020 Joseph et al.

FOREIGN PATENT DOCUMENTS

DE 102009048380 A1 4/2011
DE 202019104353 U1 * 11/2020 ............... B60D 1/62
EP 3822098 A1 5/2021
JP 201713692 A 1/2017

* cited by examiner

*Primary Examiner* — Jacob D Knutson
(74) *Attorney, Agent, or Firm* — The Webb Law Firm

(57) ABSTRACT

A work vehicle according to the present invention includes a body frame provided with at least one travel device 1, 2; and a hitch attachment section 46, 47 configured to enable attachment and removal of a hitch for attaching a work device and a hitch for towing, the hitch attachment section 46, 47 being in a front portion or a rear portion of the body frame. The work vehicle includes a sensor support 48 supporting at least one obstacle sensor 51, 52 for detecting an obstacle, and configured to be attached to the hitch attachment section 46, 47 and removed from the hitch attachment section 46, 47.

3 Claims, 6 Drawing Sheets

WORK VEHICLE

CROSS-REFERENCE TO RELATED APPLICATION

This application claims priority to Japanese Patent Application No. 2022-181286 filed Nov. 11, 2022, the disclosure of which is hereby incorporated by reference in its entirety.

BACKGROUND OF THE INVENTION

1. Field of the Invention

The present invention relates to a structure of a front portion or a rear portion of a body frame of a work vehicle.

2. Description of Related Art

A work vehicle disclosed in JP 2017-13692A includes hitch attachment sections in a front portion and a rear portion of a body frame. A work device can be attached to the body frame by attaching a hitch for attaching the work device to the front or rear hitch attachment section. When a hitch for towing is attached to the rear hitch attachment section, a wagon can be towed by the work vehicle. When the work vehicle fails to travel on soft ground, it is possible to move the work vehicle from the soft ground by attaching the hitch for towing to the front or rear hitch attachment section.

JP 2017-13692A discloses an example of related art.

SUMMARY OF THE INVENTION

An obstacle sensor that detects an obstacle with use of infrared rays or ultrasonic waves or an obstacle sensor that detects an obstacle by coming into contact with the obstacle may be provided in a front portion (or a rear portion) of a work vehicle such as a golf cart.

An object of the present invention is to realize a simple structure for attaching an obstacle sensor to a body frame of a work vehicle.

A work vehicle according to the present invention includes: a body frame provided with at least one travel device; a hitch attachment section configured to enable attachment and removal of a hitch for attaching a work device and a hitch for towing, the hitch attachment section being in a front portion or a rear portion of the body frame; and a sensor support supporting at least one obstacle sensor for detecting an obstacle, and configured to be attached to the hitch attachment section and removed from the hitch attachment section.

According to the present invention, the hitch attachment section is provided in the front portion or the rear portion of the body frame, and enables attachment and removal of a hitch for attaching a work device and a hitch for towing.

According to the present invention, the at least one obstacle sensor is supported by the sensor support, and the sensor support can be attached to the body frame by removing the hitch from the hitch attachment section and attaching the sensor support to the hitch attachment section. Thus, the obstacle sensor can be attached to the front portion or the rear portion of the body frame.

When the hitch needs to be attached to the hitch attachment section, the sensor support can be removed from the hitch attachment section to attach the hitch to the hitch attachment section.

In the configuration according to the present invention, the obstacle sensor (the sensor support) can be attached to the body frame by effectively using the hitch attachment section, and accordingly, the hitch attachment section can be used for both the purpose of attaching a hitch and the purpose of attaching the obstacle sensor, and the structure for attaching the obstacle sensor to the body frame can be simplified.

In the present invention, it is preferable that the sensor support includes: a first section supporting the at least one obstacle sensor and extending along a left-right direction; and a second section attached to the first section and extending along a front-rear direction, wherein the sensor support is attached to the hitch attachment section by inserting the second section into the hitch attachment section.

According to this aspect of the present invention, in a case where the work vehicle includes a plurality of obstacle sensors, the plurality of obstacle sensors can be easily supported by the first section of the sensor support because the first section of the sensor support extends along the left-right direction.

The sensor support can be easily attached to the hitch attachment section by inserting the second section of the sensor support into the hitch attachment section.

In the present invention, it is preferable that the at least one obstacle sensor includes: a first obstacle sensor configured to detect an obstacle with use of infrared rays or ultrasonic waves, and supported by the first section; and a left second obstacle sensor and a right second obstacle sensor each configured to detect an obstacle by coming into contact with the obstacle, the left second obstacle sensor being supported by a portion of the first section on a left side of the first obstacle sensor, and the right second obstacle sensor being supported by a portion of the first section on a right side of the first obstacle sensor.

According to this aspect of the present invention, in the case where the work vehicle includes a plurality of obstacle sensors, the first obstacle sensor is supported by a center portion of the first section of the sensor support in the left-right direction, and the second obstacle sensors are provided in the right and left portions of the first section of the sensor support.

Accordingly, when the work vehicle travels in a wide work field in which the number of obstacles is relatively small, it is possible to appropriately detect an obstacle that is relatively far from the work vehicle with use of the first obstacle sensor. When the work vehicle travels in a work field such as an orchard or a forest, in which there are many obstacles, it is possible to appropriately detect an obstacle that is close to the work vehicle with use of the second obstacle sensors.

In the present invention, it is preferable that the at least one travel device includes a front travel device and a rear travel device, and, after the sensor support is attached to the hitch attachment section, the first section is in front of the front travel device or behind the rear travel device.

According to this aspect of the present invention, after the sensor support is attached to the hitch attachment section, the first section of the sensor support is in front of the front travel device (or behind the rear travel device). Therefore, when the sensor support is configured to have sufficient strength, the first section of the sensor support can function as a bumper.

In the present invention, it is preferable that the at least one travel device includes a right travel device and a left travel device, and the first section is long enough to extend from the right travel device to the left travel device.

According to this aspect of the present invention, after the sensor support is attached to the hitch attachment section, the first section of the sensor support extends from the right travel device to the left travel device. In the case where the first section of the sensor support is configured to function as a bumper, this configuration can further enhance the function of the bumper.

BRIEF DESCRIPTION OF THE DRAWINGS

FIG. 3 is a left side view showing a body frame, a ROPS frame, a seat frame, a battery, and the like.

FIG. 4 is a plan view showing the body frame, the seat frame, the battery, and the like.

FIG. 5 is an exploded left side view showing the body frame, the ROPS frame, the seat frame, the battery, and the like.

DESCRIPTION OF THE INVENTION

FIGS. 1 to 6 show a multipurpose electric work vehicle, which is an example of a work vehicle. In FIGS. 1 to 6, F indicates the forward direction, B indicates the backward direction, U indicates the upward direction, D indicates the downward direction, R indicates the rightward direction, and L indicates the leftward direction.

Overall Configuration of Work Vehicle

Figure 1:
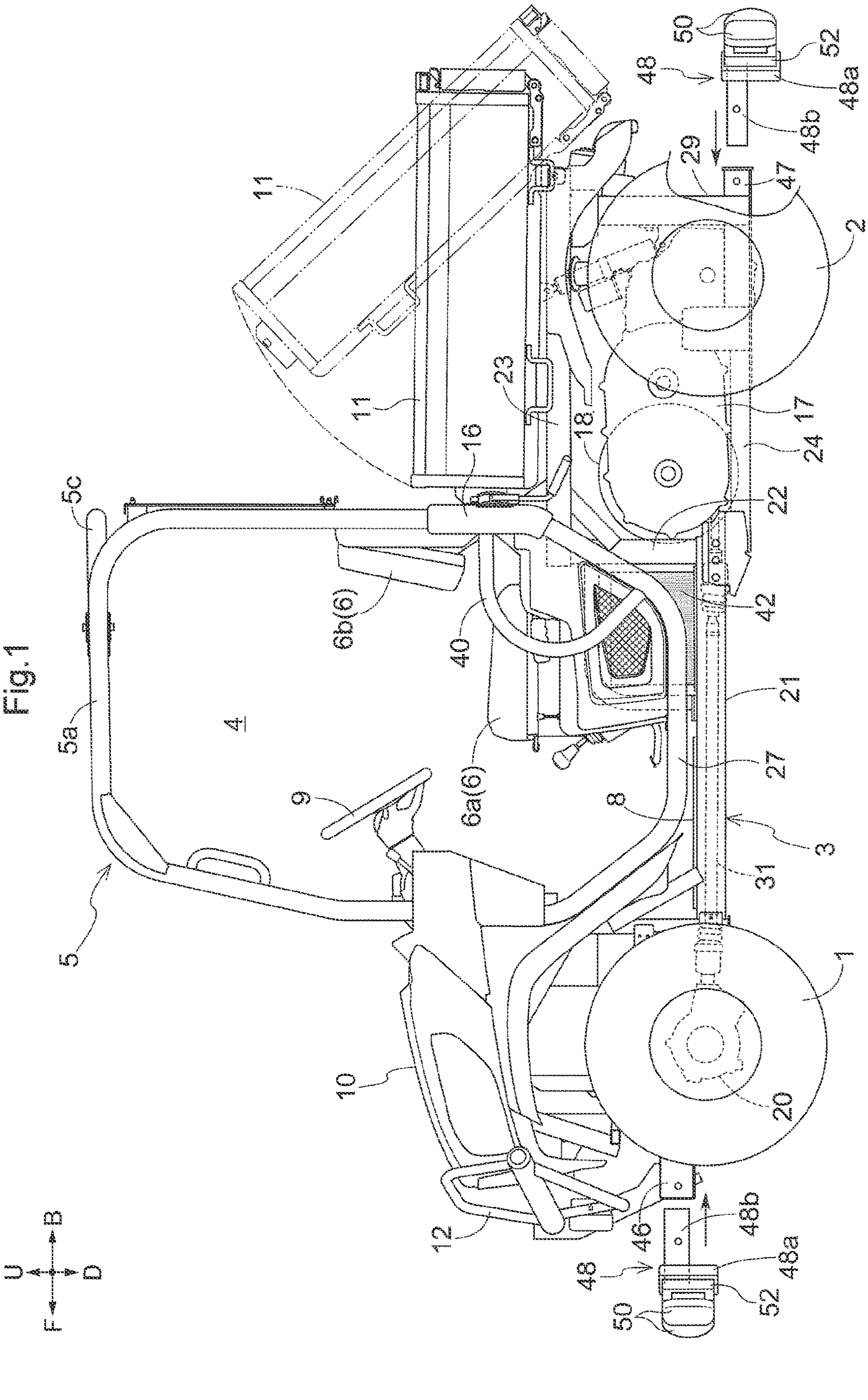
FIG. 1 is a left side view of a work vehicle.
Figure 2:
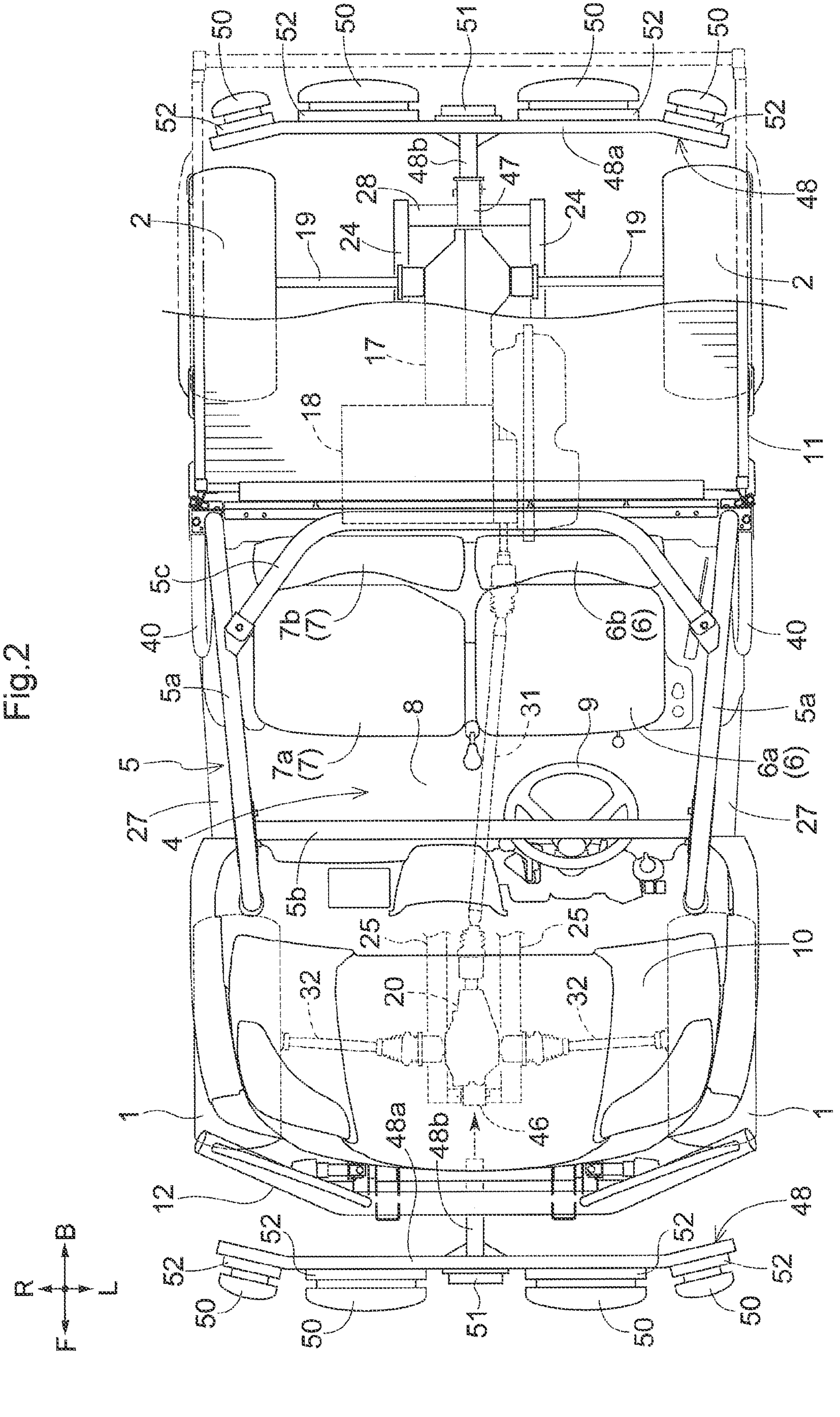
FIG. 2 is a plan view of the work vehicle.

As shown in FIGS. 1 and 2, the work vehicle includes a body frame 3. Right and left front wheels 1 for travel (corresponding to travel devices) are supported by a front portion of the body frame 3, right and left rear wheels 2 for travel (corresponding to travel devices) are supported by a rear portion of the body frame 3, and the body frame 3 is supported by the front wheels 1 and the rear wheels 2.

A seating section 4 in which a driver and an operator ride is supported by a portion of the body frame 3 between the front wheels 1 and the rear wheels 2, and the seating section 4 is surrounded by a ROPS frame 5. The seating section 4 includes a driver's seat 6 (corresponding to a seat), a passenger seat 7 (corresponding to a seat), a floor 8, a steering handle 9 for steering the front wheels 1, and the like.

The work vehicle includes a hood 10 in front of the seating section 4 and a cargo bed 11 behind the seating section 4. The cargo bed 11 can be raised and lowered between a use position shown by solid lines in FIG. 1 and a dump position (see two-dot chain lines in FIG. 1) at which a front portion of the cargo bed 11 is raised with a lower rear portion of the cargo bed 11 serving as the fulcrum.

Configuration of Body Frame

As shown in FIGS. 1 to 4, the body frame 3 includes first frame sections 21, second frame sections 22, third frame sections 23, fourth frame sections 24, fifth frame sections 25, sixth frame sections 26, and seventh frame sections 27, for example.

The first frame sections 21 extend along a front-rear direction under the seating section 4 (the floor 8). The second frame sections 22 are coupled to rear portions of the first frame sections 21 and extend upward from the rear portions of the first frame sections 21. The third frame sections 23 are coupled to upper portions of the second frame sections 22 and extend rearward from the upper portions of the second frame sections 22.

The fourth frame sections 24 are coupled to the rear portions of the first frame sections 21 and extend rearward from the rear portions of the first frame sections 21. A frame 28 extending along a left-right direction is coupled to rear portions of the right and left fourth frame sections 24. Frames 29 extending along an up-down direction are each coupled to a rear portion of one of the third frame sections 23 and a rear portion of a corresponding one of the fourth frame sections 24.

The fifth frame sections 25 are coupled to front portions of the first frame sections 21 and extend forward from the front portions of the first frame sections 21. Frames 30 extending along the up-down direction are coupled to the front portions of the first frame sections 21 and extend upward from the front portions of the first frame sections 21.

The sixth frame sections 26 are coupled to upper portions of the frames 30 and extend forward from the upper portions of the frames 30. A front guard 12 extends between front portions of the fifth frame sections 25 and front portions of the sixth frame sections 26, and is coupled to the front portions of the fifth and sixth frame sections 25 and 26.

Figure 3:
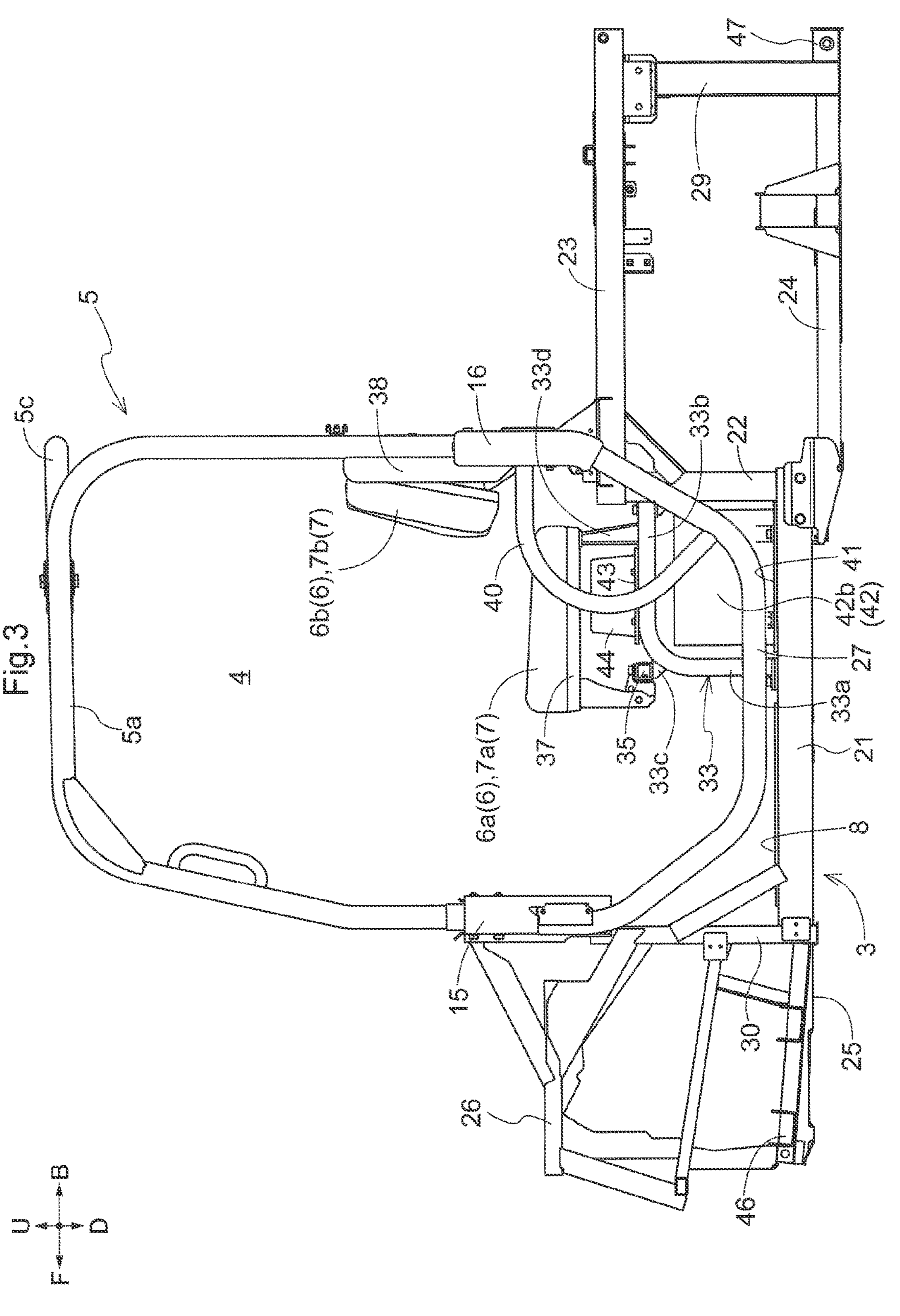
Figure 4:
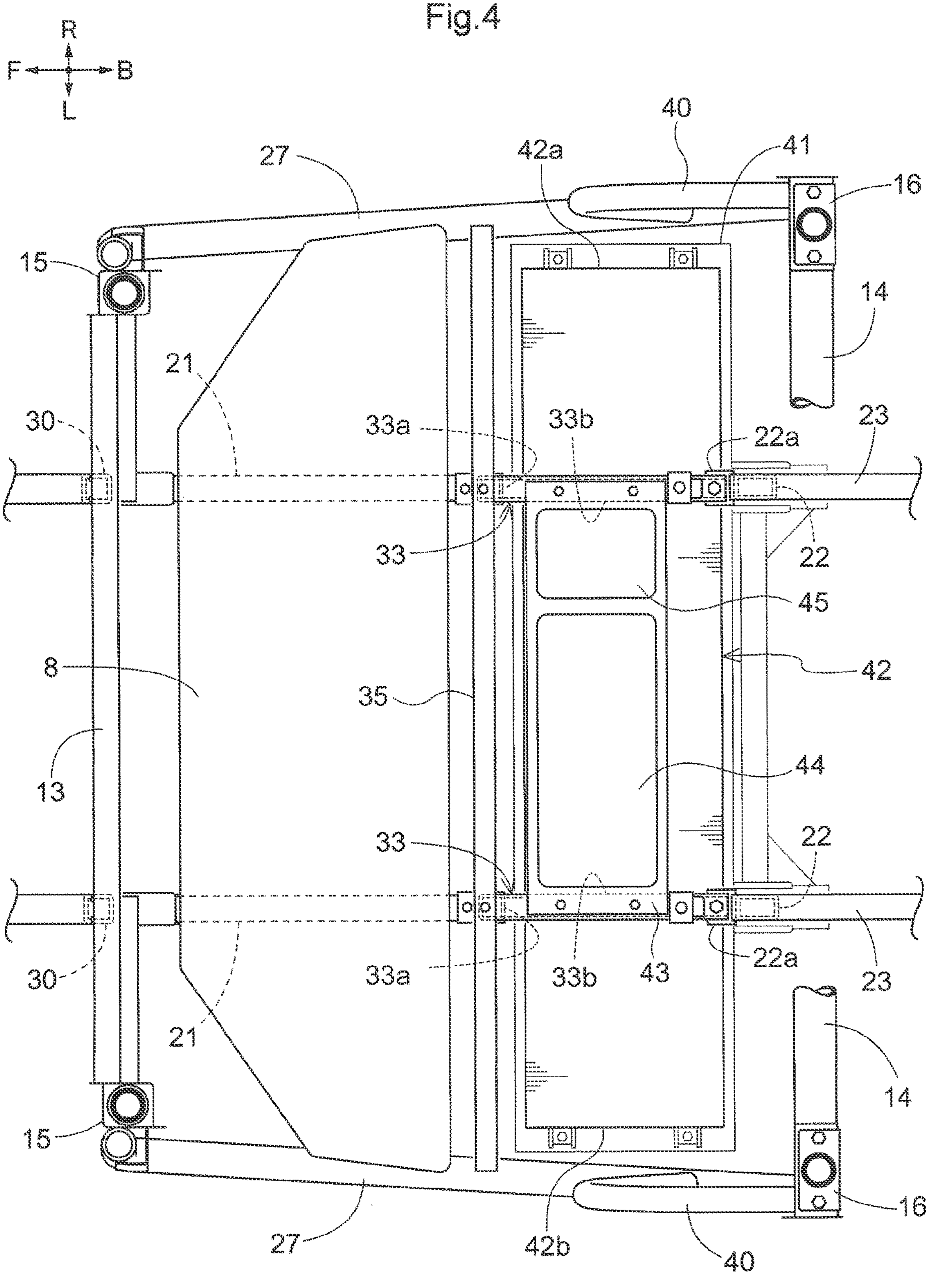

As shown in FIGS. 3 and 4, right and left front support sections 15 are coupled to the upper portions of the frames 30, and a frame 13 extending along the left-right direction is coupled to the right and left front support sections 15. A frame 14 extending along the left-right direction is coupled to front portions of the right and left third frame sections 23, and right and left rear support sections 16 are coupled to a right portion and a left portion of the frame 14.

The seventh frame sections 27 each have a U-shape (a channel shape) in a side view, upper front portions of the seventh frame sections 27 are coupled to the front support sections 15, and upper rear portions of the seventh frame sections 27 are coupled to the rear support sections 16. The floor 8 extends between the front portions of the first frame sections 21 and lower front portions of the seventh frame sections 27, and is coupled to the front portions of the first frame sections 21 and the lower front portions of the seventh frame sections 27. Right and left side guards 40 each extending from one of the rear support sections 16 to a lower rear portion of a corresponding one of the seventh frame sections 27 are coupled to the rear support sections 16 and the lower rear portions of the seventh frame sections 27.

Configuration of Travel System

As shown in FIGS. 1 and 2, the rear wheels 2 are supported via a suspension mechanism (not shown) by rear portions of the third frame sections 23 and rear portions of the fourth frame sections 24. A transmission case 17 is supported by the fourth frame sections 24, and a motor 18 is coupled to a front portion of the transmission case 17.

An auxiliary transmission (not shown) and a rear wheel differential device (not shown) are provided inside the transmission case 17. Motive power is transmitted from the motor 18 to the auxiliary transmission, subjected to speed change, and transmitted from the rear wheel differential device to the rear wheels 2 via drive shafts 19.

The front wheels 1 are supported via a suspension mechanism (not shown) by the fifth frame sections 25 and the sixth frame sections 26, and a front wheel differential device 20 is supported by the fifth frame sections 25. Motive power diverted from between the auxiliary transmission and the rear wheel differential device in the transmission case 17 is transmitted by a transmission shaft 31 to the front wheel differential device 20, and then transmitted from the front wheel differential device 20 to the front wheels 1 via drive shafts 32.

Configuration of ROPS Frame

As shown in FIGS. 2, 3, and 4, the ROPS frame 5 includes right and left first sections 5*a*, a second section 5*b*, and a third section 5*c*, for example.

The first sections 5*a* of the ROPS frame 5 each have an inverted U-shape (an inverted channel shape) in a side view. The second section 5*b* of the ROPS frame 5 extending along the left-right direction is coupled to front portions of the right and left first sections 5*a* of the ROPS frame 5. The third section 5*c* of the ROPS frame 5 extending along the left-right direction is coupled to rear portions of the right and left first sections 5*a* of the ROPS frame 5.

Lower front portions of the first sections 5*a* of the ROPS frame 5 are coupled to the front support sections 15 with use of bolts (not shown), and lower rear portions of the first sections 5*a* of the ROPS frame 5 are coupled to the rear support sections 16 with use of bolts (not shown). With this configuration, the ROPS frame 5 is attached to the body frame 3.

The ROPS frame 5 can be removed from the body frame 3 by removing the lower front portions of the first sections 5*a* of the ROPS frame 5 from the front support sections 15 and removing the lower rear portions of the first sections 5*a* of the ROPS frame 5 from the rear support sections 16.

Configuration of Seat Frames Supporting Driver's Seat and Passenger Seat

Figure 5:
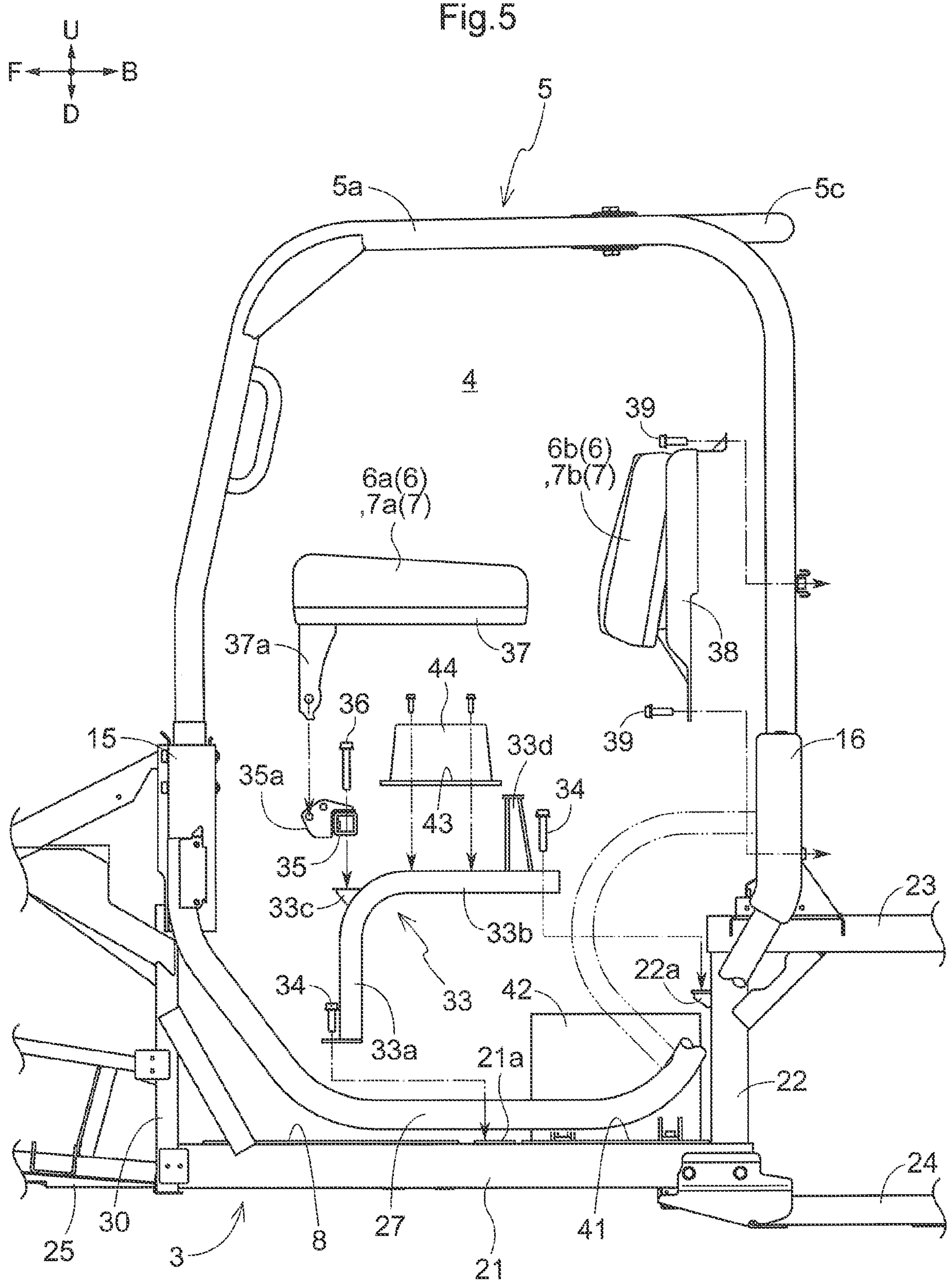

As shown in FIGS. 3, 4, and 5, the work vehicle includes right and left seat frames 33. Each seat frame 33 is formed into an L-shape (an angle shape) by bending a square pipe, and includes an up-down section 33*a* extending along the up-down direction and a front-rear section 33*b* extending rearward from an upper portion of the up-down section 33*a*.

A support section 33*c* is coupled to the upper portion of the up-down section 33*a* (a front portion of the front-rear section 33*b*) of each seat frame 33. A support section 33*d* is coupled to a rear portion of the front-rear section 33*b* of each seat frame 33.

An attachment section 21*a* is provided in the rear portion of each first frame section 21 of the body frame 3, and an attachment section 22*a* is provided in the upper portion of each second frame section 22 of the body frame 3.

A lower portion of the up-down section 33*a* of each seat frame 33 is attachable to the attachment section 21*a* of a corresponding one of the first frame sections 21 with use of a bolt 34 and removable therefrom. A rear portion of the front-rear section 33*b* of each seat frame 33 is attachable to the attachment section 22*a* of a corresponding one of the second frame sections 22 with use of a bolt 34 and removable therefrom.

Attachment State of Driver's Seat and Passenger Seat

As shown in FIGS. 3, 4, and 5, the work vehicle includes a support frame 35 having a rectangular pipe shape, and a plurality of fulcrum sections 35*a* are provided on the support frame 35. The support frame 35 is attachable to the support sections 33*c* of the seat frames 33 with use of bolts 36 and removable therefrom.

As shown in FIGS. 1 and 2, the driver's seat 6 includes a seat section 6*a* and a backrest section 6*b*, which are separate from each other, and the passenger seat 7 includes a seat section 7*a* and a backrest section 7*b*, which are separate from each other.

As shown in FIGS. 3 and 5, the work vehicle includes a flat plate-shaped support member 37, and leg sections 37*a* are provided under a front portion of the support member 37. The seat sections 6*a* and 7*a* of the driver's seat 6 and the passenger seat 7 are attached to the support member 37. The leg sections 37*a* of the support member 37 are attached to the fulcrum sections 35*a* on the support frame 35 in such a manner as to be swingable about an axis extending along the left-right direction.

The work vehicle includes a flat plate-shaped support member 38, and the backrest sections 6*b* and 7*b* of the driver's seat 6 and the passenger seat 7 are attached to the support member 38. The support member 38 is attachable to the right and left first sections 5*a* of the ROPS frame 5 with use of bolts 39 and removable therefrom.

With the configuration described above, the front portion of the support member 37 is supported via the support frame 35 by the seat frames 33 and a rear portion of the support member 37 is supported by the support sections 3*d* of the seat frames 33 in a normal use state.

Thus, the seat section 6*a* of the driver's seat 6 (seat) and the seat section 7*a* of the passenger seat 7 (seat) are supported by the seat frames 33 and supported by the body frame 3 via the seat frames 33. The backrest section 6*b* of the driver's seat 6 and the backrest section 7*b* of the passenger seat 7 are supported by the ROPS frame 5 and supported by the body frame 3 via the ROPS frame 5.

It is possible to open a region above the seat frames 33 by raising the rear portion of the support member 37 upward with the fulcrum sections 35*a* on the support frame 35 serving as fulcrums. The seat section 6*a* of the driver's seat 6 (seat) and the seat section 7*a* of the passenger seat 7 (seat) can be removed from the seat frames 33 by removing the bolts 36 and removing the support frame 35 from the seat frames 33.

The backrest section 6*b* of the driver's seat 6 and the backrest section 7*b* of the passenger seat 7 can be removed from the body frame 3 by removing the bolts 39 and removing the support member 38 from the ROPS frame 5.

Configuration Relating to Battery and Inverter

As shown in FIGS. 3, 4, and 5, a flat plate-shaped support member 41 is coupled to the rear portions of the first frame sections 21 of the body frame 3 along the left-right direction. A battery 42 is attached to the support member 41 with use of bolts (not shown) in such a manner as to be removable from the support member 41 and attachable thereto.

In the state where the battery 42 is attached to the support member 41, the battery 42 is between the up-down section 33*a* of each seat frame 33 and the second frame sections 22 and between the front-rear section 33*b* of each seat frame 33 and the first frame sections 21 in a side view.

In a plan view, a right end portion 42*a* of the battery 42 is outward of the right seat frame 33 in the lateral direction and closer to the center of the body frame 3 in the left-right direction than the right seventh frame section 27 and the right side guard 40 are. The right end portion 42*a* of the battery 42 overlaps the right seventh frame section 27 and the right side guard 40 in a side view.

In the plan view, a left end portion 42*b* of the battery 42 is outward of the left seat frame 33 in the lateral direction and closer to the center of the body frame 3 in the left-right direction than the left seventh frame section 27 and the left side guard 40 are. The left end portion 42*b* of the battery 42 overlaps the left seventh frame section 27 and the left side guard 40 in a side view.

A flat plate-shaped support member 43 is attached to the front-rear sections 33*b* of the right and left seat frames 33 with use of bolts (not shown) in such a manner as to be removable from the front-rear sections 33*b* and attachable thereto. An inverter 44 and a control device 45 are attached to the support member 43. The inverter 44 and the control device 45 are between the seat sections 6*a* and 7*a* of the driver's seat 6 and the passenger seat 7 (the support member 37) and the battery 42 (the front-rear sections 33*b* of the seat frames 33) in a side view.

When a driver seating in the driver's seat 6 operates a gear shift pedal (not shown), an operation position of the gear shift pedal is input by the control device 45, and the inverter 44 is operated by the control device 45 based on the operation position of the gear shift pedal. DC power output from the battery 42 is converted into AC power by the inverter 44 and supplied to the motor 18. The motor 18 operates to output motive power for travel, and the motive power for travel is supplied to the front wheels 1 and the rear wheels 2 as described above.

Maintenance of Battery and Inverter

As shown in FIGS. 3, 4, and 5, when the rear portion of the support member 37 is raised upward with the fulcrum sections 35*a* on the support frame 35 serving as fulcrums, the region above the seat frames 33 is opened as described above.

Maintenance of the inverter 44 and the control device 45 can be performed by raising the support member 37. The inverter 44 and the control device 45 can be removed by removing the support member 43 from the seat frames 33. Maintenance of the battery 42 can be performed by raising the support member 37 and removing the inverter 44 and the control device 45.

When the seat section 6*a* of the driver's seat 6 (seat) and the seat section 7*a* of the passenger seat 7 (seat) are removed from the seat frames 33 by removing the support frame 35 from the seat frames 33 as described above, the seat frames 33 can be removed from the body frame 3 (the first frame sections 21 and the second frame sections 22) by removing the bolts 34.

When the seat frames 33 are removed from the body frame 3 (the first frame sections 21 and the second frame sections 22), the battery 42 can be removed from the body frame 3 (the support member 41) and attached to the body frame 3 (the support member 41).

In this case, attachment and removal of the battery 42 are facilitated when the support member 38 is removed from the ROPS frame 5 by removing the bolts 39 as described above to remove the backrest section 6*b* of the driver's seat 6 and the backrest section 7*b* of the passenger seat 7 from the body frame 3.

Attachment and removal of the battery 42 are further facilitated when the ROPS frame 5 is removed from the body frame 3 by removing the lower front portions of the first sections 5*a* of the ROPS frame 5 from the front support sections 15 and removing the lower rear portions of the first sections 5*a* of the ROPS frame 5 from the rear support sections 16 as described above, in addition to removing the backrest section 6*b* of the driver's seat 6 and the backrest section 7*b* of the passenger seat 7 from the body frame 3.

Configuration of Hitch Attachment Section

As shown in FIGS. 1 and 2, a hitch attachment section 46 having a rectangular pipe shape is provided at front end portions of the fifth frame sections 25 of the body frame 3, and a hitch attachment section 47 having a rectangular pipe shape is provided at rear end portions of the fourth frame sections 24 (the frame 28) of the body frame 3.

A work device (not shown) can be attached to a front portion or a rear portion (both the front portion and the rear portion) of the body frame 3 by attaching a hitch (not shown) for attaching the work device to the hitch attachment section 46 or 47 and attaching the work device to the hitch. When the hitch is unnecessary, the hitch can be removed from the hitch attachment section 46 or 47.

When a hitch (not shown) for towing is attached to the rear hitch attachment section 47, a wagon (not shown) can be connected to the hitch and towed by the work vehicle.

When the work vehicle fails to travel on soft ground, the hitch for towing can be attached to the hitch attachment section 46 or 47. By attaching a wire (not shown) or the like to the hitch and pulling the wire or the like with use of another work vehicle (not shown), it is possible to move the work vehicle from the soft ground. When the hitch is unnecessary, the hitch can be removed from the hitch attachment section 46 or 47.

Configuration of Sensor Support

As shown in FIGS. 1 and 2, the work vehicle includes sensor supports 48. Each sensor support 48 includes a first section 48*a* extending along the left-right direction and a second section 48*b* attached to a center portion of the first section 48*a* in the left-right direction and extending along the front-rear direction. Obstacle sensors 51 and 52 are supported by the first section 48*a*.

The second sections 48*b* of the sensor supports 48 are inserted into the hitch attachment sections 46 and 47, and thus the sensor supports 48 are attached to the hitch attachment sections 46 and 47 and the body frame 3.

Figure 6:
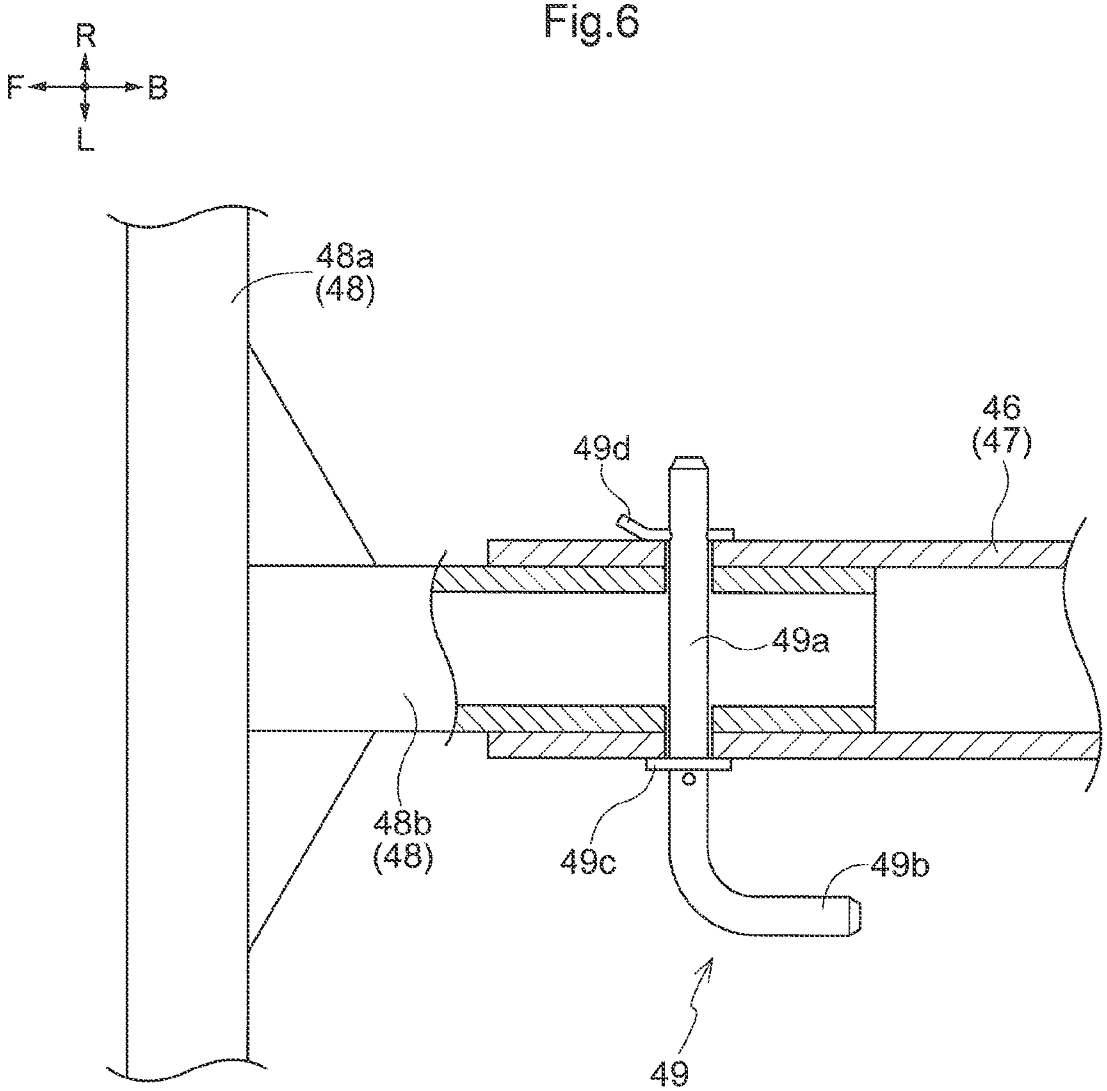
FIG. 6 is a cross-sectional plan view of a sensor support and a hitch attachment section.

The work vehicle includes fixing members 49, and as shown in FIG. 6, each fixing member 49 includes a body 49*a*, a handle portion 49*b*, a receiving portion 49*c*, and a retainer portion 49*d*, for example.

The body 49*a* of each fixing member 49 is formed like a pin. The handle portion 49*b* to be held by a worker extends from an end portion of the body 49*a* in a direction intersecting with the body 49*a*. The receiving portion 49*c* like a washer is fixed to an intermediate portion of the body 49*a*. The retainer portion 49*d* is formed like a beta pin and attachable to an end portion of the body 49*a* and removable therefrom.

After the second sections 48*b* of the sensor supports 48 are inserted into the hitch attachment sections 46 and 47, the bodies 49*a* of the fixing members 49 are inserted into openings in the hitch attachment sections 46 and 47 and openings in the second sections 48*b* of the sensor supports 48 until the receiving portions 49*c* of the fixing members 49 abut against the hitch attachment sections 46 and 47, and the retainer portions 49*d* of the fixing members 49 are attached to the end portions of the bodies 49*a*. Thus, the sensor supports 48 can be attached and fixed to the hitch attachment sections 46 and 47.

When the retainer portions 49*d* of the fixing members 49 are removed from the bodies 49*a* and the fixing members 49 are removed from the hitch attachment sections 46 and 47, the second sections 48*b* of the sensor supports 48 can be pulled out from the hitch attachment sections 46 and 47 and the sensor supports 48 can be removed from the hitch attachment sections 46 and 47.

Configuration of Obstacle Sensors

As shown in FIGS. 1 and 2, an obstacle sensor 51 (corresponding to a first obstacle sensor) is supported by a center portion of the first section 48*a* of each sensor support 48 in the left-right direction.

Obstacle sensors 52 (corresponding to second obstacle sensors) are supported by portions of the first section 48*a* of each sensor support 48 on the right side and the left side of the obstacle sensor 51.

The obstacle sensor 51 is configured to detect obstacles with use of infrared rays or ultrasonic waves, and mainly detects obstacles spaced apart from the body frame 3 in front of (or behind) the body frame 3.

Each obstacle sensor 52 is provided with a flat plate-shaped contact body 50, and detects an obstacle in response to the contact body 50 coming into contact with the obstacle. The contact bodies 50 of the obstacle sensors 52 slightly protrude forward (rearward) from the obstacle sensor 51 in a plan view.

In the state where the sensor supports 48 are attached to the hitch attachment sections 46 and 47, the first sections 48*a* of the sensor supports 48 extend from the right front wheel 1 to the left front wheel 1 and from the right rear wheel 2 to the left rear wheel 2.

When the sensor supports 48 are attached to the hitch attachment sections 46 and 47, right and left portions of the first section 48*a* of the front sensor support 48 are in front of the right and left front wheels 1. Right and left portions of the first section 48*a* of the rear sensor support 48 are behind the right and left rear wheels 2.

In the state where the front sensor support 48 is attached to the hitch attachment section 46, the front sensor support 48 (the contact bodies 50 of the obstacle sensors 52) is slightly forward of a front end portion of the front guard 12 in a side view.

In the state where the rear sensor support 48 is attached to the hitch attachment section 47, the rear sensor support 48 (the contact bodies 50 of the obstacle sensors 52) is slightly forward of a rear end portion of the cargo bed 11 in the use state (the state shown by solid lines in FIG. 1) or is substantially at the same position as the rear end portion of the cargo bed 11 in a side view. Therefore, even when the cargo bed 11 is moved to the dump position and soil on the cargo bed 11 is discharged downward, the soil discharged from the cargo bed 11 is unlikely to come into contact with the rear sensor support 48 (the obstacle sensors 51 and 52).

First Variation of Implementation of the Invention

A configuration is also possible in which the sensor support 48 (the obstacle sensors 51 and 52) is attached to the front hitch attachment section 46 and is not attached to the rear hitch attachment section 47.

A configuration is also possible in which the sensor support 48 (the obstacle sensors 51 and 52) is attached to the rear hitch attachment section 47 and is not attached to the front hitch attachment section 46.

Second Variation of Implementation of the Invention

A configuration is also possible in which right and left hitch attachment sections 46 are provided next to each other in the left-right direction at the front end portions of the fifth frame sections 25 of the body frame 3, and right and left hitch attachment sections 47 are provided next to each other in the left-right direction at the rear end portions of the fourth frame sections 24 (the frame 28) of the body frame 3.

In this case, two second sections 48*b* can be attached to the first section 48*a* of each sensor support 48. By inserting the two second sections 48*b* of the sensor support 48 into the right and left hitch attachment sections 46 (the right and left hitch attachment sections 47), the sensor support 48 (the first section 48*a*) is firmly attached to the body frame 3.

Third Variation of Implementation of the Invention

In a case where the obstacle sensor 51 configured to detect obstacles with use of infrared rays or ultrasonic waves is provided in the first section 48*a* of the sensor support 48 and the contact-type obstacle sensors 52 are not provided, the length of the first section 48*a* of the sensor support 48 may be shorter than the width between the right and left front wheels 1 (rear wheels 2).

Fourth Variation of Implementation of the Invention

Crawler-type travel devices (not shown) may be provided as front travel devices, instead of the front wheels 1. Crawler-type travel devices (not shown) may be provided as rear travel devices, instead of the rear wheels 2. A front wheel 1 and a rear wheel 2 may be replaced with one crawler-type travel device (not shown).

INDUSTRIAL APPLICABILITY

The present invention is applicable to not only an electric work vehicle that drives a travel device with use of a motor but also a hybrid work vehicle that drives a travel device with use of an engine and a motor, as well as a work vehicle only equipped with an engine, rather than an electric work vehicle and a hybrid work vehicle.

DESCRIPTION OF REFERENCE NUMERALS

1 Front wheel (travel device)
2 Rear wheel (travel device)
3 Body frame
46 Hitch attachment section
47 Hitch attachment section
48 Sensor support
48*a* First section
48*b* Second section
51 Obstacle sensor (first obstacle sensor)
52 Obstacle sensor (second obstacle sensor)

What is claimed is:

1. A work vehicle comprising:

a body frame provided with at least one travel device;

a hitch attachment section configured to enable attachment and removal of a hitch for attaching a work device and a hitch for towing, the hitch attachment section being in a front portion or a rear portion of the body frame; and a sensor support supporting at least one obstacle sensor for detecting an obstacle, and configured to be attached to the hitch attachment section and removed from the hitch attachment section, wherein the sensor support comprises:

a first section supporting the at least one obstacle sensor and extending along a left-right direction; and a second section attached to the first section and extending along a front-rear direction, wherein the sensor support is attached to the hitch attachment section by inserting the second section into the hitch attachment section, wherein the at least one obstacle sensor comprises:

a first obstacle sensor configured to detect an obstacle with use of infrared rays or ultrasonic waves, and supported by the first section; and a left second obstacle sensor and a right second obstacle sensor each configured to detect an obstacle by coming into contact with the obstacle, the left second obstacle sensor being supported by a portion of the first section on a left side of the first obstacle sensor, and the right second obstacle sensor being supported by a portion of the first section on a right side of the first obstacle sensor, wherein the left second obstacle sensor and the right second obstacle sensor each comprise a flat plate-shaped contact body, and wherein the flat plate-shaped contact body of the left second obstacle sensor and the right second obstacle sensor protrude outward from the first section of the sensor support beyond the first obstacle sensor in a plan view.

2. The work vehicle according to claim 1, wherein the at least one travel device comprises a front travel device and a rear travel device, and wherein after the sensor support is attached to the hitch attachment section, the first section is in front of the front travel device or behind the rear travel device.

3. The work vehicle according to claim 2, wherein each of the front travel device and the rear travel device comprises a right travel device and a left travel device, and wherein the first section is long enough to extend from the right travel device to the left travel device.

* * * * *